(12) United States Patent
Rodoni

(10) Patent No.: US 11,080,628 B2
(45) Date of Patent: Aug. 3, 2021

(54) WASTE MANAGEMENT SYSTEM HAVING SERVICE CONFIRMATION

(71) Applicant: Rubicon Global Holdings, Inc., Atlanta, GA (US)

(72) Inventor: Philip Rodoni, Decatur, GA (US)

(73) Assignee: Rubicon Technologies, LLC, Atlanta, GA (US)

(*) Notice: Subject to any disclaimer, the term of this patent is extended or adjusted under 35 U.S.C. 154(b) by 0 days.

(21) Appl. No.: 15/151,009

(22) Filed: May 10, 2016

(65) Prior Publication Data

US 2016/0379154 A1    Dec. 29, 2016

Related U.S. Application Data

(60) Provisional application No. 62/306,515, filed on Mar. 10, 2016, provisional application No. 62/306,553, (Continued)

(51) Int. Cl.
  *G06Q 10/06* (2012.01)
  *G06Q 10/08* (2012.01)
  *G06Q 10/00* (2012.01)

(52) U.S. Cl.
  CPC . *G06Q 10/063114* (2013.01); *G06Q 10/0832* (2013.01); *G06Q 10/0833* (2013.01);
  (Continued)

(58) Field of Classification Search
  CPC .......... G06Q 10/063114; G06Q 10/30; B60G 2204/11; G05B 2219/32029; B29B 2017/0094; G05D 2201/0213
  (Continued)

(56) References Cited

U.S. PATENT DOCUMENTS 4,609,994 A *  9/1986  Bassim .................... G01H 1/00
                                                          702/39
4,956,999 A *  9/1990  Bohannan ................ G01H 1/00
                                                          73/587

(Continued)

FOREIGN PATENT DOCUMENTS

WO    WO 1992/016907 A1    10/1992
WO    WO 2000/063864 A1    10/2000

OTHER PUBLICATIONS

Round et al., Future Ride: Adapting New Technologies to Paratransit in the United States, 1996, The University of California Transportation Center, University of California at Berkeley, UCTC No. 306 https://escholarship.org/uc/item/3j05r8m8#page-2.*

(Continued)

*Primary Examiner* — Jerry O'Connor
*Assistant Examiner* — Shelby A Turner
(74) *Attorney, Agent, or Firm* — Rock IP, PLLC

(57) ABSTRACT

A system is disclosed for managing waste services performed by a service vehicle. The system may have at least one sensor disposed onboard the service vehicle and configured to generate a first signal indicative of a waste service being completed by the service vehicle. The system may also have a computing device in communication with the at least one sensor. The computing device may be configured to determine, based on the second signal, that the waste service has been performed. The computing device may also be configured to selectively generate an electronic response based on performance of the waste service.

25 Claims, 10 Drawing Sheets

Figure 1:
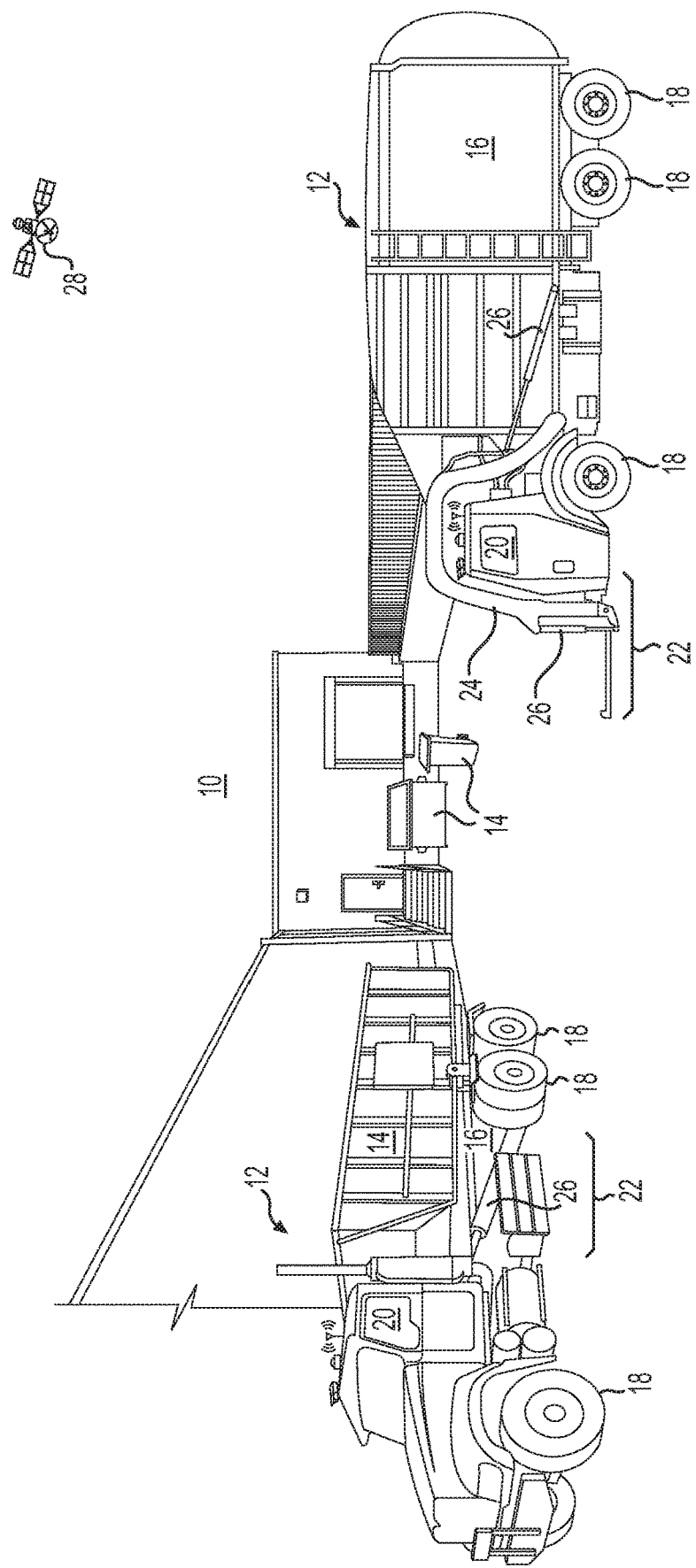

Related U.S. Application Data filed on Mar. 10, 2016, provisional application No. 62/299,183, filed on Feb. 24, 2016, provisional application No. 62/183,454, filed on Jun. 23, 2015.

(52) U.S. Cl.
CPC .............. *G06Q 10/30* (2013.01); *Y02P 90/00* (2015.11); *Y02P 90/80* (2015.11)

(58) Field of Classification Search
USPC ........................................................ 705/7.39
See application file for complete search history.

(56) References Cited

U.S. PATENT DOCUMENTS

| | | | | |
|---|---|---|---|---|
| 5,014,206 | A * | 5/1991 | Scribner | G07C 5/008 340/3.31 |
| 5,245,137 | A * | 9/1993 | Bowman | B65F 3/04 177/1 |
| 5,327,347 | A * | 7/1994 | Hagenbuch | G01G 19/08 701/29.4 |
| 6,632,064 | B1 * | 10/2003 | Walker | B65F 1/122 220/908 |
| 8,983,677 | B2 * | 3/2015 | Wright | H04B 11/00 381/56 |
| 2002/0040328 | A1 * | 4/2002 | Reichwein | G06Q 40/12 705/305 |
| 2004/0254811 | A1 | 12/2004 | Horstemeyer | |
| 2005/0095096 | A1 * | 5/2005 | Curotto | B65F 3/041 414/406 |
| 2005/0155429 | A1 | 7/2005 | Griessler et al. | |
| 2008/0077541 | A1 * | 3/2008 | Scherer | G06Q 30/0283 705/400 |
| 2008/0086320 | A1 * | 4/2008 | Ballew | G06Q 10/0637 705/342 |
| 2008/0275643 | A1 * | 11/2008 | Yaqub | G01C 21/343 701/412 |
| 2009/0035064 | A1 * | 2/2009 | Holl | B28D 7/00 404/90 |
| 2010/0179912 | A1 * | 7/2010 | Curotto | G01G 19/08 705/308 |
| 2010/0199655 | A1 * | 8/2010 | Renner | B66C 23/42 60/431 |
| 2010/0241320 | A1 * | 9/2010 | Lugash | B60P 1/4471 701/49 |
| 2011/0010005 | A1 * | 1/2011 | Tan | B66C 13/46 700/214 |
| 2011/0128118 | A1 * | 6/2011 | Gilleland | B60R 25/24 340/5.2 |
| 2011/0225098 | A1 * | 9/2011 | Wolff | G06Q 10/30 705/308 |
| 2011/0238598 | A1 * | 9/2011 | Borowski | G06Q 99/00 705/500 |
| 2012/0120449 | A1 | 5/2012 | Flood et al. | |
| 2012/0285750 | A1 * | 11/2012 | Hynes | G01G 19/083 177/1 |
| 2014/0046585 | A1 * | 2/2014 | Morris, IV | G01C 21/3415 701/468 |
| 2014/0343801 | A1 * | 11/2014 | Whitfield, Jr. | B65F 3/041 701/49 |
| 2014/0379588 | A1 * | 12/2014 | Gates | G06Q 10/30 705/308 |
| 2015/0225188 | A1 * | 8/2015 | Belluk | B65G 65/005 700/230 |
| 2015/0307273 | A1 * | 10/2015 | Lyman | G01G 19/08 705/7.13 |
| 2017/0078400 | A1 * | 3/2017 | Binder | H04L 67/12 |

OTHER PUBLICATIONS

"Basics of Structural Vibration Testing and Analysis", LDS Dactron, 2003 https://www.calpoly.edu/~cbirdson/Publications/AN011%20Basics%20of%20Structural%20Testing%20%20Analysis.pdf (Year: 2003).*

Catania, Vincenzo, and Daniela Ventura. "An approch for monitoring and smart planning of urban solid waste management using smart-M3 platform." Proceedings of 15th conference of open innovations association FRUCT. IEEE, 2014 (Year: 2014).*

B. Chowdhury and M. U. Chowdhury, "RFID-based real-time smart waste management system," 2007 Australasian Telecommunication Networks and Applications Conference, Christchurch, New Zealand, pp. 175-180, doi: 10.1109/ATNAC.2007.4665232. (Year: 2007).*

N. Zingirian and C. Valenti, "Sensor clouds for Intelligent Truck Monitoring," 2012 IEEE Intelligent Vehicles Symposium, Madrid, Spain, pp. 999-1004, doi: 10.1109/IVS.2012.6232192. (Year: 2012).*

International Search Report and Written Opinion dated Sep. 1, 2016, in corresponding PCT/US2016/035398, eight (8) pages.

* cited by examiner

FIG. 6

ARRIVED
BIG J COFFEE

WASTE RECEPTACLE NUMBER

AB123456

DETECT ANOTHER RECEPTACLE

SUBMIT

600

FIG. 7

ARRIVED
BIG J COFFEE

PICKUP WEIGHT: 30 LB

UPDATE RECORD | OVERWRITE PICKUP WEIGHT | REPORT A PROBLEM

700

FIG. 8

ARRIVED
BIG J COFFEE

REPORT A PROBLEM

○ RECEPTACLE NOT FOUND
⊘ RECEPTACLE INACCESSIBLE
○ OTHERS

SUBMIT

800

WASTE MANAGEMENT SYSTEM HAVING SERVICE CONFIRMATION

RELATED APPLICATIONS

This application is based on and claims priority to U.S. Provisional Application No. 62/306,515 filed on Mar. 10, 2016; 62/299,183 filed on Feb. 24, 2016; 62/306,553 filed on Mar. 10, 2016; and 62/183,454 filed on Jun. 23, 2015, the contents of all of which are expressly incorporated herein by reference.

TECHNICAL FIELD

The present disclosure relates generally to a management system and, more particularly, to a waste management system having service confirmation.

BACKGROUND

Commercial and residential waste service providers typically dispatch service vehicles to customer properties according to a predetermined pickup schedule assigned to each vehicle. The pickup schedule for each service vehicle is often designed to provide waste services within a particular geographical area and at a particular frequency (e.g., once per week). After completion of the waste services, the vehicle operator may report the completion to a back office, which updates the operator's schedule and an account record for the customer. Customers that subscribe to these waste services are then billed based on the account record.

In some instances, it may be difficult to confirm that the scheduled pick was completed and/or completed in a manner desired by the customer (e.g., on a desired day, at a desired time, etc.). In particular, the only method used to verify the completion is self-reporting of the vehicle operator, who may make a mistake in performing the pickup service or otherwise introduced errors in reporting of the service. In addition, no automated mechanism currently exists to provide remedial action for a waste service that cannot be completed in the manner desired by the customer.

The disclosed system is directed to overcoming one or more of the problems set forth above and/or other problems of the prior art.

SUMMARY

In one aspect, the present disclosure is directed to a system for managing waste services performed by a service vehicle. The system may include at least one sensor disposed onboard the service vehicle that is configured to generate a second signal indicative of a waste service being completed by the service vehicle. The system may further include a computing device in communication with the at least one sensor. The computing device may be configured to determine, based on the first signal, that the waste service has been performed. The computing device may also be configured to selectively generate an electronic response based on performance of the waste service.

In another aspect, the present disclosure is directed to a method for managing waste services performed by a service vehicle. The method may include generating a first signal indicative of a waste service being completed by the service vehicle. The method may also include determining, based on the first signal, that the waste service has been performed.

The method may further include selectively generating an electronic response based on performance of the waste service.

In yet another aspect, the present disclosure is directed to a non-transitory computer readable medium containing computer-executable programming instructions for performing a method of waste management by a service vehicle. The method may include generating a first signal indicative of a location of the service vehicle, and determining that the service vehicle has stopped based on the first signal. The method may also include generating a second signal only when the service vehicle is determined to be stopped, the second signal being one of a force signal, a motion signal, and an acoustic signal. The method may further include determining that the waste service has been performed at a target location based on the first signal and based on a comparison of the second signal with known data corresponding to expected waste services normally performed by a service vehicle. The method may additionally include selectively generating an electronic response based on performance of the waste service, making a determination that the service vehicle cannot complete a waste service at one of a plurality known customer locations based on the first signal, and selectively adjusting a schedule of stops for the service vehicle based on the determination.

BRIEF DESCRIPTION OF THE DRAWINGS

FIG. 1 is an isometric illustration of an exemplary disclosed waste management environment;

FIG. 2 is a diagrammatic illustration of an exemplary disclosed system that may be used to manage the environment of FIG. 1;

FIG. 3 is a flowchart depicting an exemplary disclosed method that may be performed by the system of FIG. 2; and FIGS. 4-12 are diagrammatic illustrations of exemplary disclosed graphical user interfaces that may be used to access the system of FIG. 2.

DETAILED DESCRIPTION

FIG. 1 illustrates an exemplary waste management environment ("environment") 10, at which one or more service vehicles 12 are providing waste services. Environment 10 may include a retail store, a factory, a government building, a residential address, or another location having one or more receptacles 14 that require the service of service vehicle(s) 12. The service may include, for example, the removal of waste materials from inside of receptacle(s) 14, the replacement of receptacle(s) 14, and/or the placement of new or additional receptacles 14.

Service vehicle 12 may take many different forms. In the example shown on the right in FIG. 1, service vehicle 12 is a hydraulically actuated, front-loading type of service vehicle. Specifically, service vehicle 12 may include a bed 16 supported by a plurality of wheels 18, a cab 20 located forward of bed 16, and a lifting device 22 extending forward of cab 20. Lifting device 22 may consist of, among other things, one or more lift arms 24 configured to engage and/or grasp receptacle 14, and one or more actuators 26 powered by pressurized oil to raise and tilt lift arms 24 (and receptacle 14) up past cab 20 to a dump location over bed 16. After dumping of receptacle 14, pressurized oil may be released from hydraulic actuator(s) 26 to allow lowering of lift arms 24 and receptacle 14 back to the ground in front of service vehicle 12.

In other examples, lifting device 22 may be located to pick up receptacles 14 from a side and/or a rear of service vehicle 12. In yet other examples, receptacles 14 may be manually lifted and dumped into bed 16. In any of these examples, bed 16 could be outfitted with a compactor (not shown) to compact the waste material after the material is dumped into bed 16, and/or a door (not shown) configured to close an opening of bed 16 through which the waste material is dumped. Other configurations may also be possible.

In the example shown on the left in FIG. 1, service vehicle 12 is a hydraulically actuated flatbed or roll-off type of service vehicle. Specifically, service vehicle 12 may include a bed 16 supported by a plurality of wheels 18, a cab 20 located forward of bed 16, and a lifting device 22 extending rearward of cab 20. Lifting device 22 may consist of, among other things, one or more actuators 26 powered by pressurized oil to raise and tilt receptacle 14 up onto bed 16 for transportation of receptacle 14 away from environment 10. After dumping of receptacle 14 at a landfill (or swapping a full receptacle 14 for an empty receptacle 14), receptacle 14 may be returned to environment 10 and lowered back to the ground behind service vehicle 12 (e.g, by releasing pressurized oil from hydraulic actuator(s) 26).

As each service vehicle 12 moves about environment 10, a satellite 28 or other tracking device may communicate with an onboard controller 30 (shown only in FIG. 2) to monitor the movements of service vehicle 12 and the associated changes made to environment 10 (e.g., pickup, dumping, placement, etc.). As will be explained in more detail below, onboard controller 30, or a separate offboard controller 32 (e.g., a controller 32 located in a back office 34 or other service facility—shown only in FIG. 2), may then manage future operations of service vehicle 12 (and other similar service vehicles 12) based on these movements and changes.

Both of onboard and offboard controllers 30, 32 may include means for monitoring, recording, storing, indexing, processing, communicating, and/or controlling other onboard and/or offboard devices. These means may include, for example, a memory, one or more data storage devices, a central processing unit, or any other components that may be used to run the disclosed application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

Figure 2:
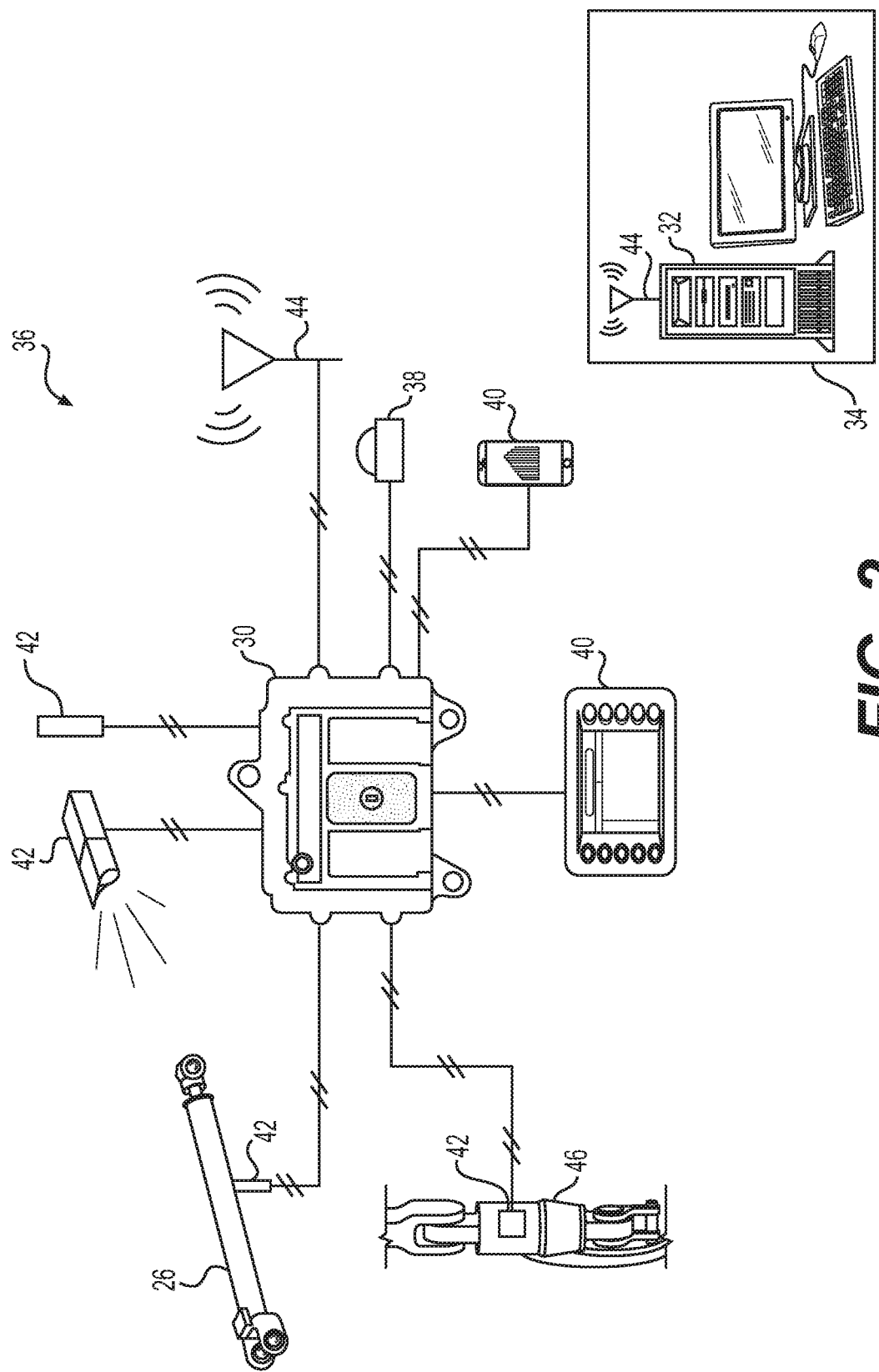

As shown in FIG. 2, onboard controller 30 may form a portion of a waste management system ("system") 36 that is configured to track, assist, and/or control movements of service vehicle(s) 12 (shown only in FIG. 1). In addition to onboard controller 30, system 36 may also include a locating device 38, and at least one of a manual input device 40 and a sensor 42 mounted or otherwise located onboard each service vehicle 12. In some embodiments, system 36 includes both manual input device 40 and one or more sensors 42. In other embodiments, sensor 42 (and/or onboard controller 30) may be internal to manual input device 40. Onboard controller 30 may be in communication with each of these other components and/or with offboard controller 32 at back office 34 (e.g., via a communication device 44), and configured to determine, based on signals from these components and based on other known information stored in memory, the location of each service vehicle 12 and characteristics and locations of receptacles 14 being moved by and/or in a vicinity of each service vehicle 12.

Locating device 38 may be configured to generate signals indicative of a geographical position and/or orientation of service vehicle 12 relative to a local reference point, a coordinate system associated with environment 10, a coordinate system associated with Earth, or any other type of 2-D or 3-D coordinate system. For example, locating device 38 may embody an electronic receiver configured to communicate with satellites 28 (referring to FIG. 1), or a local radio or laser transmitting system used to determine a relative geographical location of itself. Locating device 38 may receive and analyze high-frequency, low-power radio or laser signals from multiple locations to triangulate a relative 3-D geographical position and orientation. In some embodiments, locating device 38 may also be configured to determine a location and/or orientation of a particular part of service vehicle 12, for example of lift arms 24 (shown only in FIG. 1). Based on the signals generated by locating device 38 and based on known kinematics of service vehicle 12, onboard controller 30 may be able to determine in real time, the position, heading, travel speed, acceleration, and orientation of service vehicle 12 and lift arms 24. This information may then be used by onboard and/or offboard controllers 30, 32 to update the locations and conditions of service vehicle(s) 12 and/or receptacles 14 in an electronic map or database of environment 10.

It is contemplated that locating device 38 may take another form, if desired. For example, locating device 38 could be an RFID reader configured to interact with an RFID tag located within environment 10 (e.g., at a customer location, on receptacle 14, etc.), or another type of scanner configured to read another type of indicia (e.g., a barcode) within environment 10. Based on the reading of the RFID tag or other indicia, the location and/or orientation of service vehicle 12 may be linked to the known location of the RFID tag or other indicia within environment 10.

Manual input device 40 may provide a way for an operator of service vehicle 12 to input information regarding observances made while traveling around environment 10. For example, the operator may be able to enter a type and/or condition of waste observed at a particular location, an amount of waste in or around receptacle 14, a fill status of a particular receptacle 14, a condition of receptacle 14, a location of receptacle 14, and or other information about the receptacle and waste engaged by, loaded into, or otherwise processed by service vehicle 12. The information may be input in any number of ways, for example via a cab-mounted touch screen interface, via one or more buttons, via a keyboard, via speech recognition, via a mobile device (e.g., a smartphone or tablet) carried by the operator, or in another manner known in the art. In some embodiments, the operator may also be able to respond to inquiries received via input device 40, if desired. In addition to receiving manual input from an operator, input device 40 may also be capable of displaying information, for example the electronic map of environment 10, instructions from back office 34, scheduling, receptacle information (e.g., ID, configuration, location, weight, etc.), payload information (e.g., weight and/or volume), questions, etc.

In some embodiments, input device 40 may be configured to execute an application. For example, when input device 40 is a mobile device (for example a smartphone), the application can be a mobile app ("app"). The app can provide a graphical user interface (GUI) that displays information about a waste handling operation to an operator of service vehicle 12; and that receives input from the operator used to configure acquisition of operational data by sensor(s) 42, to transmit the operational data to controllers 30, 32, to receive and display information about a current operation (e.g., as monitored by sensor(s) 42), etc.

Sensors 42 may be any type of sensing and/or transducing device configured to monitor parameters associated with the waste material loaded into service vehicle 12 and/or the associated receptacles 14 being moved by service vehicle 12 (e.g., moved by lift arms 24), and to generate corresponding signals indicative thereof. Each of these sensors 42 may be any type of device known in the art, and located anywhere on or in service vehicle 12. In one example, sensor 42 may embody a lift sensor, such as any one or more of a load cell, a force gauge, a pressure sensor, a motion sensor, or another type of lift sensor associated directly with lift arms 24, with actuator(s) 26, with receptacle 14, and/or with a strut 46 supporting bed 16. In this example, the signals generated by sensor(s) 42 may correspond with strain on lift arms 24, with a force applied to lift arms 24 by actuator(s) 26, with a payload weight of bed 16, with a motion of receptacle 14, with a weight of waste contained inside receptacle 14, etc.

Alternatively, one or more sensors 42 may be associated with a power source or drivetrain of service vehicle 12, and configured to generate signals indicative of an amount of power used to propel service vehicle 12, to drive the hydraulics of actuators 26, to move the in-bed compactor, or to shut the associated door. Other types of sensors 42 (e.g., optical sensors such as cameras, spectrometers, IR sensors, RADAR sensors, LIDAR sensors, etc.) may also be utilized to determine characteristics (e.g., load profile, volume, and/or shape) of the waste material inside receptacles 14 or of receptacles 14 themselves. In yet further examples, sensor 42 could be an acoustic sensor (e.g., one or more microphones), an accelerometer, or another similar type of sensor configured to detect engagement conditions and/or cycle completion of lift arms 24, the in-bed compactor, the door, etc. during lifting, dumping, and/or shaking of receptacle 14. Other types of sensors 42 (e.g., proximity sensors) may alternatively or additionally be utilized. Signals generated by these sensors 42 may be communicated to onboard and/or offboard controllers 30, 32, and the appropriate controller may use the signals to determine conditions surrounding receptacles 14 (and/or the waste inside receptacles 14) before, during, and/or after servicing by service vehicle 12. As described above, any one or more of sensors(s) 42 may form an integral portion of input device 40 (e.g., the smartphone or tablet carried by the operator) or be a standalone component in wired or wireless communication with controllers 30, 32 and/or input device 40, as desired.

Onboard controller 30 may be configured to manage communications between other onboard components and offboard controller 32 located at back office 34. For example, onboard controller 30 may receive signals from locating device 38, input device(s) 40, and sensor(s) 42, and correlate the signals, filter the signals, buffer the signals, record the signals, or otherwise condition the signals before directing the signals offboard via communication device 44.

Communication device 44 may be configured to facilitate communication between onboard controller 30 and offboard controller 32. Communication device 44 may include hardware and/or software that enable the sending and/or receiving of data messages through a communications link. The communications link may include satellite, cellular, infrared, radio, and any other type of wireless communications. Alternatively, the communications link may include electrical, optical, or any other type of wired communications, if desired. In one embodiment, onboard controller 30 may be omitted, and offboard controller 32 may communicate directly with locating device 38, input device(s) 40, and/or sensor(s) 42 via communication device 44, if desired. Other means of communication may also be possible.

Figure 3:
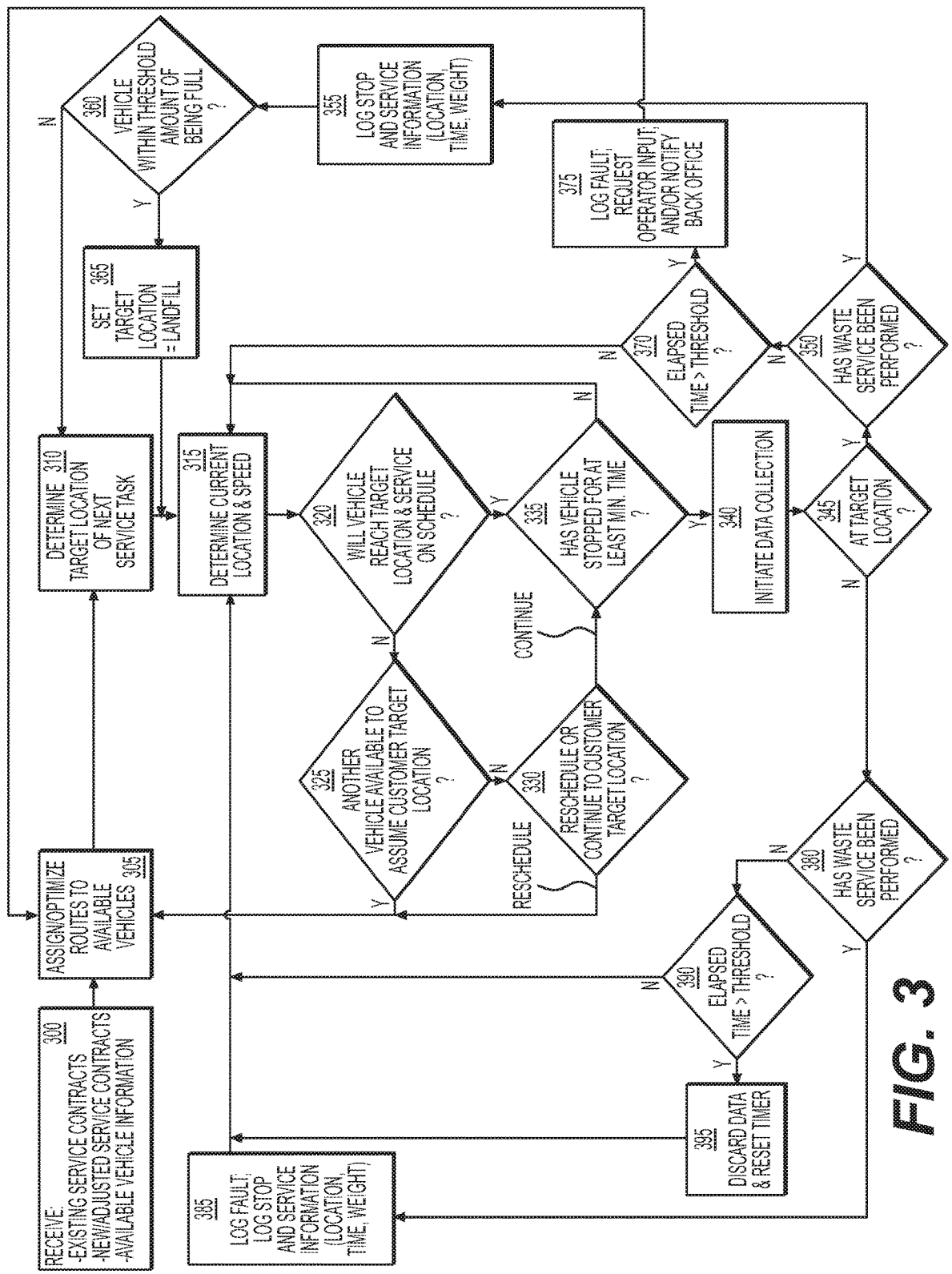

Onboard and/or offboard controllers 30, 32, based on the information received from onboard service vehicles 12 and also based on information received from other sources (e.g., from the Internet, from input at back office 34, etc.), can be configured to execute instructions stored on computer readable medium to perform methods of waste management at environment 10. For example, onboard and/or offboard controllers 30, 32 may be configured to monitor when service vehicle 12 is nearing a target location (e.g., based on the known address and signals from locating device 38), when service vehicle 12 has stopped, when service vehicle 12 is servicing receptacle 14, when service vehicle 12 is filled with waste to a maximum capacity, etc. This monitoring may then be used to determine route assignments for service vehicle 12, determine business costs and efficiencies, determine service opportunities, make route adjustments, etc. An exemplary process is illustrated in FIG. 3, and will be explained in more detail in the following section to further illustrate the disclosed concepts.

FIGS. 4-12 represent exemplary Graphical User Interfaces (GUIs) that may be shown on any input device 40 or otherwise used to access system 36. FIGS. 4-12 will also be discussed in greater detail below to further illustrate the disclosed concepts.

INDUSTRIAL APPLICABILITY

The disclosed system may be applicable to the waste service industry, where service monitoring can affect profitability and efficiency. The disclosed system may be able to automatically monitor movement of a service vehicle 12 and detect completion of an assigned waste service in a manner desired by a customer. In addition, the disclosed system may be able to determine when the assigned waste service cannot be completed in the manner desired by the customer, and to selectively implement a remedial action. Operation of system 36 will now be described with reference to FIG. 3.

As shown in FIG. 3, operation of system 36 may begin with receipt of service related information (Step 300). This information may be received by any one or more of the computing devices of system 36 (e.g., onboard controller 30, offboard controller 32, and/or manual input device 40) and include, among other things, existing contracts for service, adjustments to the existing contracts, and new contracts. The contracts may detail locations at which a particular customer desires waste services to be performed, a timing (e.g., date, day, time, and/or frequency) of the services, and details about the service (e.g., a number, configuration, and/or size of receptacles 14 at the customer location that require service; a type of waste; and/or instructions regarding access to receptacles 14). In addition, the service-related information obtained at step 300 may include details about service vehicles 12 that are available to perform the services. These details may include a number, type, size, location, capacity, and availability of service vehicles 12. The contract and/or service vehicle information may be received directly from the customer(s), from representatives of the service provider of system 36, from contracted service providers, from the operator of service vehicle 12, and/or from an electronic data storage, memory, or database of system 36.

Based on the service-related information received at step 300, different routes of service stops may be determined and assigned to different available service vehicles 12 (Step 305). The assignments may be determined and/or assigned manually (e.g., by a manager at back office 34) or automatically (e.g., by offboard controller 32), and communicated to the operator of each service vehicle 12 by way of communication device 44. The route assignments may be determined based on a comparison of service needs with available service resources. For example, any one or more of the corresponding computing device(s) of system 36 (e.g., onboard controller 30, offboard controllers 32, and/or input device 40) may marry the details of a specific customer location; service time; and receptacle size, configuration, and weight with an appropriately sized and configured service vehicle 12 available within the general area at the desired time of service. The stops within each assignment may be sequentially arranged into a route according to any strategy known in the art. For example, the stops may be arranged according to geographical location, distances between locations, expected amounts of waste to be picked up at each location, urgency, waste type, desired service times, traffic conditions, anticipated vehicular speeds, etc. The routes may then be stored, for example, within onboard controller 30 and/or any one of input devices 40.

The operator may follow the assigned route and perform waste services at each customer location in the route in the sequential order provided. In particular, a target location of a next customer in the route may be automatically determined for the operator (Step 310). The target location determination may be made, for example, by any computing device(s) of system 36 based on a correlation between a current time and a time listed for a next scheduled service stop. Alternatively, the service vehicle operator could manually select a target location from a list of locations on the assigned route, if desired. For example, the operator could override input device 40 and choose a target location that is not listed as the next location in the provided sequence. Alternatively or additionally, back office 34 may override input device 40 and inform the operator (e.g., via a dispatch call) of a target location that is not listed as the next location in the provided sequence. Once the target location is relayed to, and/or selected by, the operator of a particular service vehicle 12, subsequent travel of service vehicle 12 toward the target may be monitored. In particular, the current location and speed of service vehicle 12 may be tracked, for example by way of locating device 38 (Step 315).

Based on the monitored travel of service vehicle 12 (e.g., a monitored location and/or speed) and a scheduled time of the next service to be completed at a target location in the route assigned to service vehicle 12, then the computing device(s) of system 36 may be configured to determine if service vehicle 12 is capable of completing the next scheduled waste service (Step 320). For example, if it is determined that service vehicle 12 is within a threshold distance and/or anticipated travel time of the next target location, the computing device(s) may determine that the service is possible at the desired time. Otherwise, the computing device(s) may determine that it is not possible to complete the scheduled service within the desired time.

In one embodiment, the computing device(s) may be configured to continually determine and/or adjust the distance threshold and/or anticipated travel time used in the comparison of step 320, in order to reduce the likelihood of making a premature determination regarding service vehicle 12 being capable of timely completing the assigned waste service at the target location. For example, the distance threshold can be continually adjusted based on the changing location and speed of service vehicle 12, and can be progressively reduced as service vehicle 12 approaches the target location. On the other hand, the distance threshold and/or anticipated travel time can also be progressively increased (or remain unchanged), when service vehicle 12 is determined to be moving away from the target location. In some cases, in addition to the travel direction affecting the radius threshold and/or time used for comparison purposes in step 320, other factors, such as a deviation between an actual trajectory and a scheduled trajectory, actual traffic conditions and expected traffic conditions, etc., can also have an effect.

When it is determined that a particular service vehicle 12 will be unable to perform an assigned waste service at a scheduled time (step 320:N), the computing device(s) of system 36 may be configured to determine if another service vehicle 12 may be able to assume the scheduled waste service at the target location in the route of the particular service vehicle 12 (Step 325). For example, the computing device(s) may determine if the other service vehicle 12 has a correct configuration (e.g., a configuration and/or remaining fill capacity required to service the particular receptacles 14 at the target location), if the other service vehicle 12 has enough time within its assigned schedule, and/or if the other service vehicle 12 is within the distance threshold and/or travel time of the target location to take over the scheduled service from the particular service vehicle 12. When this is true (step 325:Y), control may return to step 304 where the target location will be transferred from the assigned route of the particular service vehicle 12 to the assigned route of the other service vehicle 12.

In some instances, the other service vehicle 12 may not have the right configuration and/or be immediately available to introduce an additional service stop into its existing route of assigned stops. For example, the other service vehicle 12 may be too full and/or not in the general vicinity of the additional service stop and/or not have enough time between already scheduled stops for insertion of the additional stop. In these instances, the computing device(s) of system 36 may determine if the target location that the particular service vehicle 12 is not capable of timely servicing should be rescheduled or if a particular service vehicle 12 should continue travel toward the target location and still complete the assigned waste service (Step 330), even though the service will be late. In some situations, keeping the target location in the existing schedule, even though the particular service vehicle 12 will be late in performing the service, may cause all remaining service stops in the assigned route to also be late. When this is unacceptable, control may return to step 305 where the corresponding service stop will be reassigned to another day, another time, and/or another service vehicle 12. A status update regarding this reassignment may be recorded in the corresponding customer's account and/or communicated to the customer, as desired. When continuing to the particular target location and performing the waste service in a delayed manner is acceptable and/or will not cause the remaining service stops in the route of service vehicle 12 to also be delayed, control may instead proceed to a step 335.

At step 335, after determining that service vehicle 12 will be able to provide the assigned waste service (on time or late), any one or more of the computing devices of system 36 may determine (e.g., based on the monitored travel speed and/or changing location) if service vehicle 12 has stopped (e.g., not moved more than about ten meters) for at least a minimum amount of time (Step 335). Many different strategies may be used to determine if service vehicle 12 has stopped. In one example, the location signal alone may be used to make this determination, for example based on a change in location being less than a threshold amount (e.g., less than about 10 miles), within a predetermined period of time. Alternatively, a tracked speed being less than a threshold speed may be used to determine stopping of service vehicle 12. In another embodiment, a change in payload (e.g., weight and/or volume), as indicated via signals from sensors(s) 42 may indicate that service vehicle 12 is likely to be stopped and/or performing a service. Stopping may also be determined in other ways, if desired. As long as it is determined that service vehicle 12 is still traveling (step 335:N), control may loop back through step 315.

The computing device(s) of system 36 may require service vehicle 12 to be stopped for at least the minimum amount of time, in some applications, to help filter out inconsequential stops, such as stops at traffic lights, stops caused by congestion or road work, etc. In one embodiment, the minimum amount of time is about 15-30 seconds. It should be noted, however that other minimum amounts of times may be used, as desired.

Other filters may additionally or alternatively be used to help filter out inconsequential stops during travel toward a target location, in some applications. In particular, the traveled distance and/or speed may be used in conjunction with the location of service vehicle 12 to determine if the stop of service vehicle 12 is consequential. For example, when service vehicle 12 is determined to no longer be moving, but also located at a traffic light, on the freeway, at a road work location, etc., the stop may be determined to be part of normal travel toward the target location. As long as it is determined that service vehicle 12 is still traveling toward its target location (step 315:N), control may loop back through step 310.

When it is determined that service vehicle 12 has made a consequential stop or is otherwise no longer following a travel path toward its target location (step 335:Y), data collection may be initiated (Step 340). The data collection may include, among other things, the collection of signals generated by sensor(s) 42. For example, a force, strain, motion, and/or sound associated with movement of lift arms 24, the in-bed compactor, the bed door, etc. may be captured. By collecting this data only when it is determined that service vehicle 12 has stopped for at least the minimum amount of time, an amount of collected data and a corresponding size of memory required to hold and/or process the data may be reduced. In addition to collecting data following completion of step 335, a current location of service vehicle 12 may be compared to the target location of the next stop to determine if the current stop coincides with the target location (Step 345). It should be noted that, although step 345 is shown in FIG. 3 as occurring after step 340, step 345 could alternatively occur before or at the same time as step 340, as desired.

It is contemplated that additional and/or other ways could be used to determine that service vehicle 12 has arrived at the target location, if desired. In particular, the data collected by sensor(s) 42 could be used to confirm the arrival, if desired. For example, a bar code affixed to a particular receptacle 14 at the customer location could be scanned and compared to an expected bar code. In another example, an image of the location and/or receptacle 14 could be captured and compared with one or more images stored in memory. In yet another example, the operator of service vehicle 12 could push a button, check a box, or otherwise electronically confirm arrival at the target location. Other methods may also be implemented.

When the stop of service vehicle 12 detected at step 335 is determined at step 345 to have occurred at the target location of the next customer in the assigned route of service vehicle 12, the computing device(s) of system 36 may determine if a waste service has been performed at that stop (Step 350). The waste service may include, among other things, the emptying of receptacle 14 into bed 16 at the target location. The determination of whether the waste service has been performed may be made based on the data collected at step 340. In particular, if the collected data corresponds with forces, strains, motions, weight changes, volume changes, and/or sounds normally experienced by service vehicle 12 during performance of typical waste services, it can be concluded that a waste service has been performed. Values of the forces, strains, motions, weights, volumes, and/or sounds normally experienced by service vehicle 12 during performance of the typical waste services may be stored in the memory of the computing device(s) of system 36 for comparison purposes.

In the disclosed example, sensor 42 is an acoustic sensor configured to capture vibrations associated with the emptying of receptacle 14. The relevant captured vibrations could be associated, for example, with any one or more of the activation of actuators 26 (referring to FIG. 1), the lifting movement of arms 24, the shaking of receptacle 14, the banging of a receptacle lid or bed door, the movement of the in-bed compactor, the falling of waste from receptacle 14 into bed 16, etc. Specifically, a sound profile (e.g., a frequency signature) consisting of sequences or patterns of vibrations having particular amplitudes, frequencies, and/or spacing may be captured and then compared to data stored in memory. The stored sound profiles may be unique to each service vehicle 12, to a type of service vehicle 12, to a size of service vehicle 12, to a configuration of service vehicle 12, to a particular receptacle 14, to a type of receptacle 14, to a size of receptacle 14, etc. As an illustrative example, it can be pre-determined that when actuators 26 of lift arms 24 of a certain front-loading type of service vehicle 12 are activated, the acoustic signals produced by sensor 42 will include a frequency component within the range of 6,000-7,000 Hz. Accordingly, when a frequency component within this range is detected at step 350, the corresponding waste service may be confirmed by the computing device(s) of system 36. In some embodiments, the frequency of the signals generated by sensor 42 may first be filtered and/or processed (e.g., via Fourier Fast Transform) before comparison with the stored sound profiles, if desired. It is contemplated that the vibrational data collected via sensor 42 could be used in another way to determine that a particular service has been performed by service vehicle 12.

When it is determined at step 350 that a waste service has been performed at the target location (step 350:Y), information associated with the stop and the service may be logged into system 36 (Step 355). As is known in the art, the logged information may then be used to bill the customer, pay the service provider, adjust future service routes, etc.

After the completion of each waste service, the computing device(s) of system 36 may determine if service vehicle 12 is within a threshold amount (e.g., within 10%) of being filled to capacity (Step 360). This determination may be made in any number of ways. For example, based on a current weight of waste material inside bed 16, as measured by sensor(s) 42, and based on a maximum allowed weight stored in memory, the computing device(s) may be able to calculate if the current weight is within the threshold amount. Alternatively, a tare weight of each receptacle 14 may be determined each time receptacle 14 is emptied into bed 16. A running total of the tare weights may then be compared to the maximum allowed weight to determine if service vehicle 12 is filled to within the threshold amount. In yet another embodiment, captured images of the profile of waste inside bed 16 may be compared to profiles of bed 16 filled with a maximum amount of material to make the determination of step 360. Other ways may also be utilized.

When it is determined that service vehicle 12 is filled to within the threshold amount of its capacity, the computing device(s) may set a landfill location as the next target location (Step 365) in the route of scheduled stops for service vehicle 12. It is contemplated that a landfill stop may already be scheduled within the route of service vehicle 12, at a point where service vehicle 12 is predicted to be filled or nearly filled to capacity. In some embodiments, the actual fill rate may substantially match the predicted fill rate, and service vehicle 12 may be directed to the landfill at the time already scheduled within its route. In other instances, however, service vehicle 12 may fill at a faster or slower rate. In these instances, the landfill stop may need to be moved up or back in the lineup of other scheduled stops based on the determination made in step 365. Accordingly, control may proceed from step 360 through step 365 to step 315 or from step 360 to step 310, depending on the actual fill rate of service vehicle 12. When the landfill stop needs to be moved up or back in the lineup of other stops, the other stops may be rescheduled to accommodate the change. When rescheduling occurs, the account records of the customer may need to be adjusted and/or the customer may need to be alerted based on the rescheduling. It should be noted that, when the next target location is the landfill stop, the determination made at step 350 may be associated with unloading of service vehicle 12 rather than with emptying of receptacle 14 into bed 16.

In some embodiments, unloading of service vehicle 12 at the landfill may include emptying of bed 16. Thereafter, service vehicle 12 may continue to a next target location corresponding with another customer and emptying of another receptacle 14 into bed 16. In other embodiments, however, service vehicle 12 may carry receptacle 14 from the customer location to the landfill for emptying of receptacle 14. In these embodiments, the empty receptacle 14 may need to be returned to the same customer location, before a different customer location can be serviced. Accordingly, in some instances, the next target location, after leaving the landfill stop, may be a return to the previous target location. It is contemplated that the schedule of assigned routes may account for both embodiments. Additionally or alternatively, the operator of service vehicle 12 may be able to indicate the need for return to the same customer location for deposition of the emptied receptacle 14, and the need may be accommodated by the computing device(s) of system 36 with a schedule adjustment, as desired.

Returning to step 350, when it is determined that a waste service has not yet been performed (step 350:N), a time elapsed since service vehicle 12 stopped may be determined and compared to a threshold time (Step 370). As long as the elapsed time is less than the threshold time (step 370:N), control loop back through step 315. The threshold time used at step 370 may be an amount of time expected to elapse during a normal service event at the given location. In some embodiments, the threshold time may also include a buffer that accounts for minor unexpected delays or efficiency differences between operators and/or service vehicles 12. When it is determined at step 370 that the elapsed time exceeds the threshold time (step 370:Y), any number of responses may be automatically implemented (Step 375). For example, a fault may be electronically logged into system 36 in association with the particular service vehicle 12, with the particular operator, with the particular location, etc.; the operator may be provided with an electronic notice (e.g., via input device 40) and/or a request for input explaining the delay; back office 34 may be electronically notified; the customer may be notified; etc. In one instance, in addition to the notice being provided to the operator of service vehicle 12, the operator may also be provided with selectable options to explain the delay such as, "report an incident", "equipment malfunction", "request help", "provide instructions", "stopped for fuel", "on break", etc.

Based on the feedback received from the operator at step 375, steps may be taken to ensure that the waste service is still performed at the corresponding customer location. This may include, for example, assigning the task to another service vehicle 12 (i.e., control may loop back to step 305). Alternatively, assistance (e.g., a repair technician, a tow truck, additional manpower, etc.) may be directed to the customer location in an attempt to facilitate completion of the assigned waste service by the service vehicle 12 already at the location. For instance, service vehicle 12 may have broken down or receptacle 14 may be oriented such that service vehicle 12 cannot properly lift and dump receptacle 14. In this situation, the dispatched repair technician or additional manpower may be able to remedy the breakdown or move receptacle 14 to a better position for lifting.

Returning to step 345, when it is determined that the stop detected at step 355 does not coincide with the target location of the next customer in the assigned route, control may proceed to a step 380 that is substantially identical to step 350 described above. That is, a determination may be made regarding performance of a waste service at the stop location, even though the stop location does not correspond with a subscribing customer. When it is determined that a waste service was made at the stop location (e.g., based on the data collected at step 340), the computing device(s) of system 36 may electronically log a fault and store corresponding information associated with the stop and the service performed while at the stop (Step 385). Control may then return to step 315, allowing the operator of service vehicle 12 to continue the assigned route and travel to the target location of the next scheduled customer. In some embodiments, the computing device(s) of system 36 may additionally adjust the schedule of the remaining customers in the assigned route based on delays caused by the unscheduled stop, if desired. In yet other embodiments, the computing device(s) can also be configured to automatically assign one or more of any remaining waste-service tasks and/or scheduled stops to another service vehicle 12 and operator (e.g., based on the other service vehicle's progress of a different assigned route), such that the delay caused by the unscheduled stop and service does not continue to impact the rest of the day's scheduled services.

At step 380, when it is determined that a waste service has not yet been performed at the non-customer location (e.g., based on the data captured at step 340), a time elapsed since the stop of service vehicle 12 may be determined and compared to a threshold time (Step 390). As long as the elapsed time is less than the threshold time (step 390:N), control may return to step 315. The threshold time used at step 390 may be the same or a different amount of time used at step 370, as desired. In some embodiments, the threshold time used at step 390 may be an amount of time normally required to perform a standard waste service that is less than an amount of time associated with other expected delays (e.g., a time for the operator to obtain and consume lunch) that are sometimes encountered during completion of the assigned route. When it is determined at step 390 that the elapsed time is greater than the threshold time (step 390:Y), it can be concluded that the unscheduled stop is not associated with a service activity and the captured data may be discarded (Step 395). Control may then return from step 395 to step 315.

Figure 4:
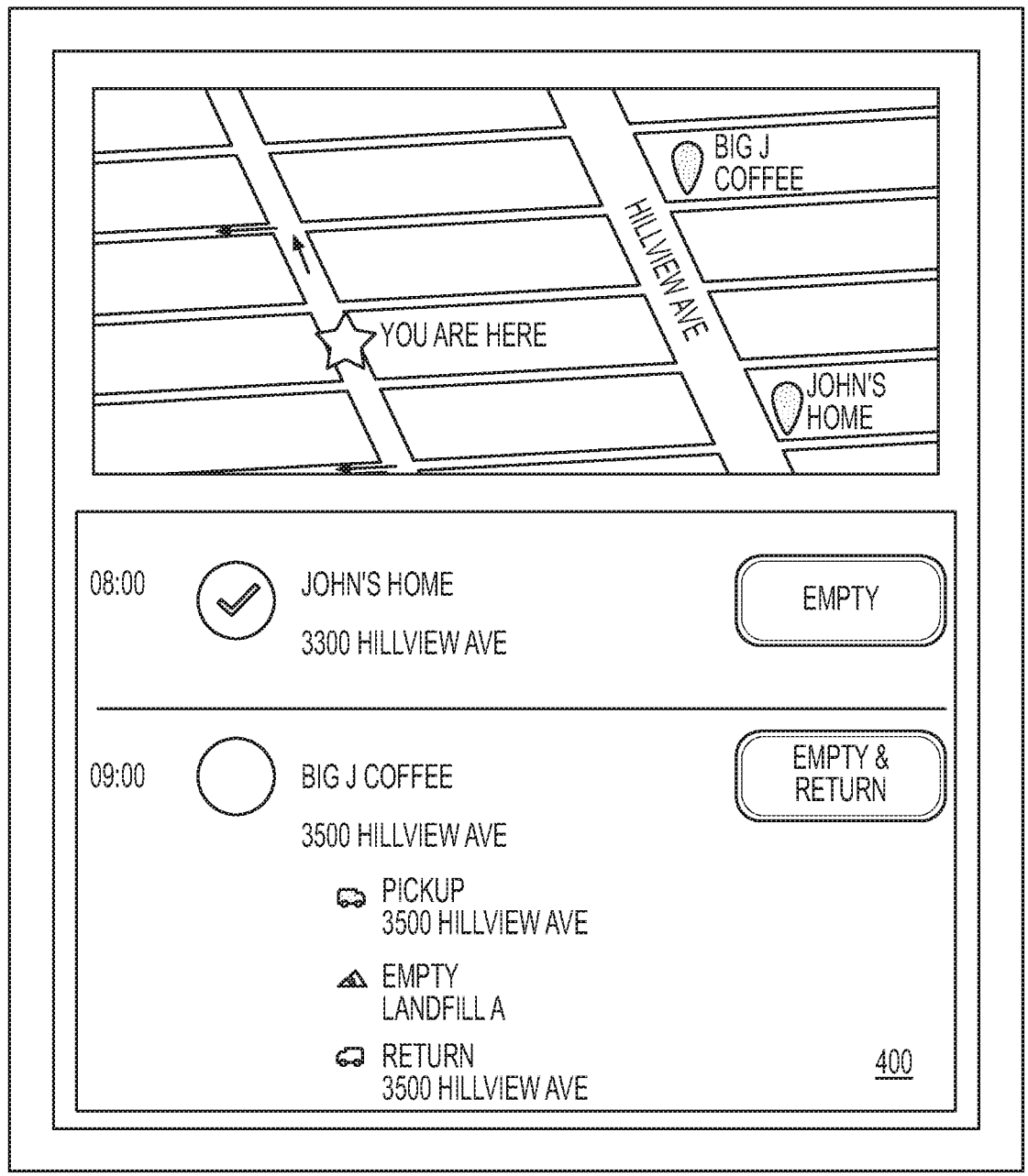
Figure 5:
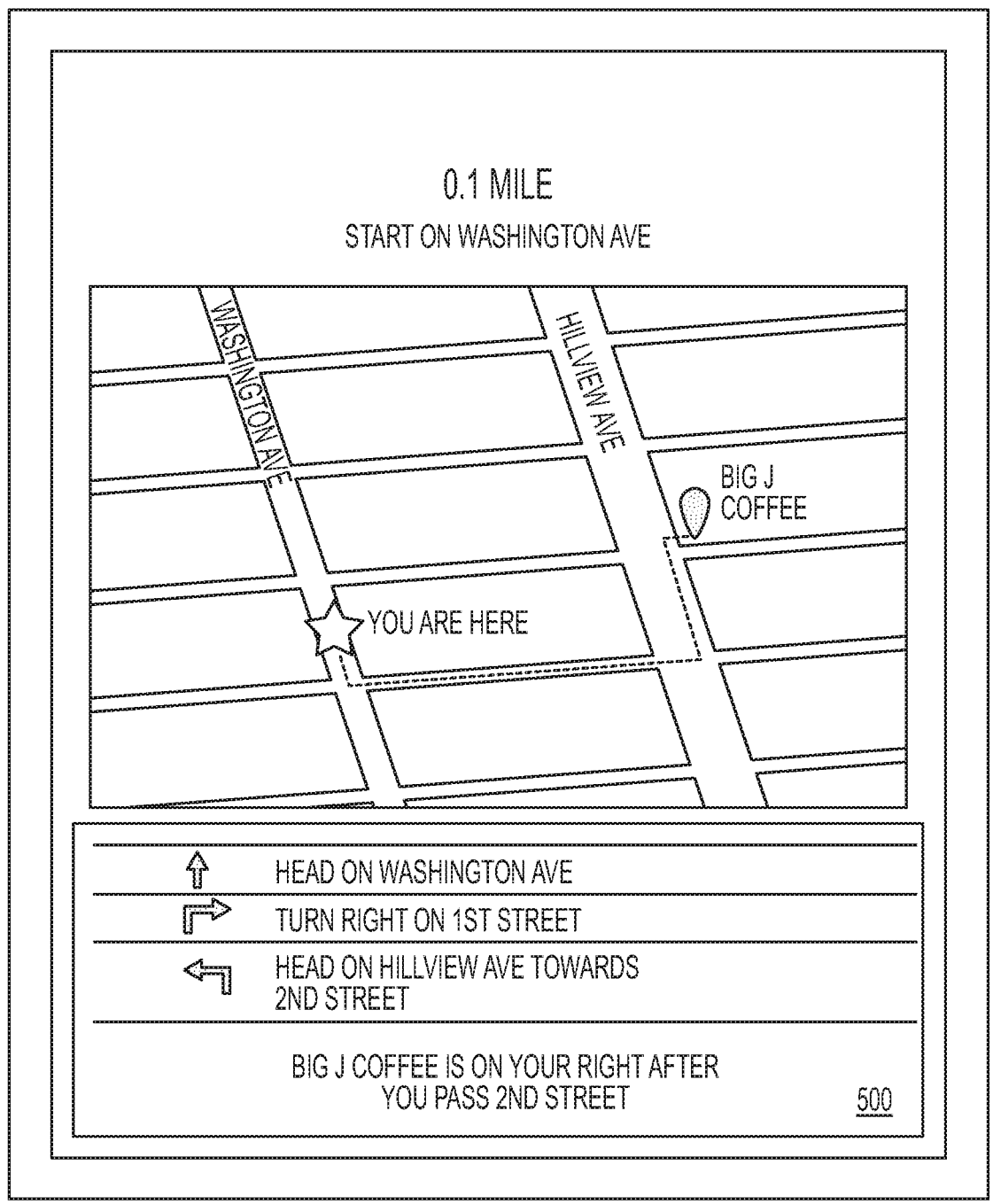

FIGS. 4 and 5 show exemplary GUIs 400 and 500, respectively, that may be used to facilitate the process that is described above and shown in FIG. 3. GUIs 400 and 500 (as well as the other GUIs of FIGS. 6-12) may be shown on any onboard input device 40 (referring to FIG. 2) and, as can be seen in FIGS. 4 and 5, may correspond with steps 305-315 in the flowchart of FIG. 3. In particular, via GUIs 400 and 500, the operator of service vehicle 12 may be provided with visual representations of a unique route assigned to service vehicle 12. The representations may include a listing of scheduled stops, along with an indication of which stops have been completed and a target location for a next stop. In addition, a map may be provided showing the stop locations, along with a representation of a current location of service vehicle 12. Addresses and/or turn-by-turn directions may be provided, along with service instructions for each location. In some embodiments, the operator may be able to provide input during travel to and/or service at each location in the assignment. For example, the operator may be able to manually indicate arrival at a location and/or completion of the assigned service. In addition, in some embodiments, the operator may be able to select a particular location shown on GUI 400, and receive additional information about the selection via GUI 500. For example, the map may zoom in to the selected location, and directions specific to that location may be shown. It is contemplated that the zoomed-in view and/or details from GUI 500 could be automatically shown to the operator based on a proximity to the target location, if desired.

FIGS. 6-8 show exemplary GUIs 600, 700, and 800 that may also be used to facilitate the process of FIG. 3. Specifically, GUIs 600-800 may correspond with steps 340-355 and 375 in the flowchart of FIG. 3, and provide an operator with information regarding a service performed at a customer location. The service information may include, for example, an identification of a receptacle 14 to be serviced, and/or a weight of the waste dumped from receptacle 14 into bed 16 of service vehicle 12. In some embodiments, GUI 600 may provide the operator with the receptacle identification information. In other embodiments, however, GUI 600 may provide the opportunity to detect and/or capture (e.g., via still image) the receptacle identification information. GUI 700 may provide the option for the operator to adjust the displayed information and/or to provide a reason for delayed servicing. For example, the operator may be able to update a record, overwrite a pickup weight or volume, and/or report a problem. Via GUI 800, the operator may then be able to provide details regarding any problem experienced when attempting to service receptacle 14. Exemplary problems reportable via GUI 800 may include, among others, that receptacle 14 cannot be found, that receptacle 14 is inaccessible, or that other problems have occurred. It is contemplated that the details from GUIs 600-800 could be automatically shown and/or made available to the operator based on a detected arrival at the target location, if desired.

Figure 9:
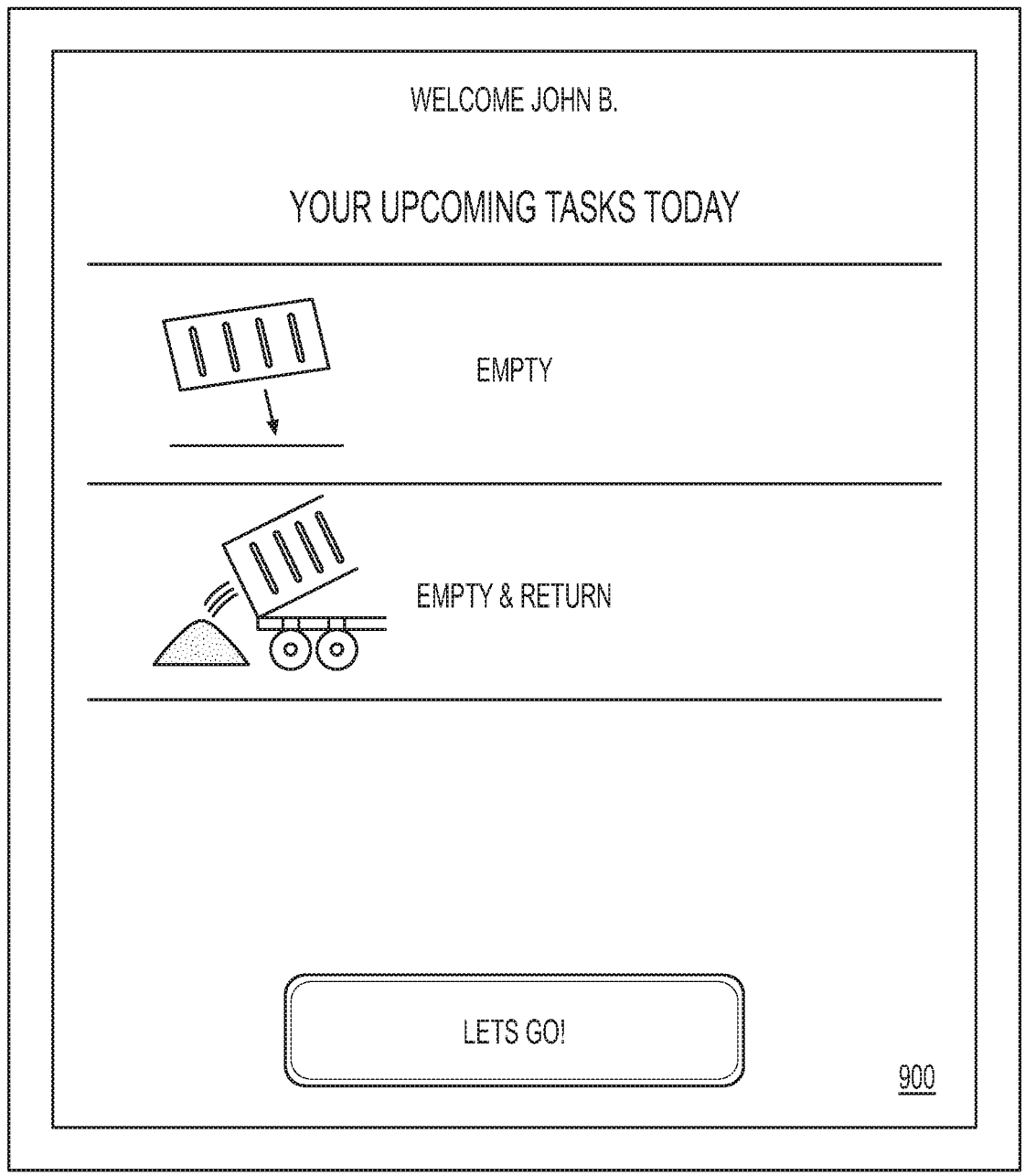

FIG. 9 illustrates an exemplary GUI 900 that may be shown in connection with completion of step 305 and/or steps 360 and 365. Specifically, when a route assignment is made consisting of multiple different service stops, information about each stop and/or just a next stop may be relayed to the operator. For example, the information may instruct the operator to empty the receptacle 14 found at the customer site into bed 16 and/or to pick up receptacle 14 and carry it to a landfill. After emptying of the carried receptacle 14 to the landfill, the instructions may indicate that the emptied receptacle 14 should be returned to its original location. The operator may indicate understanding of the instructions by depressing a button indicating readiness to initiate operation. Additionally or alternatively, when it is determined at steps 360 and 365 that a target location of a next scheduled stop should be a landfill, the operator may then be instructed what services are required during and/or after the landfill visit.

Figure 10:
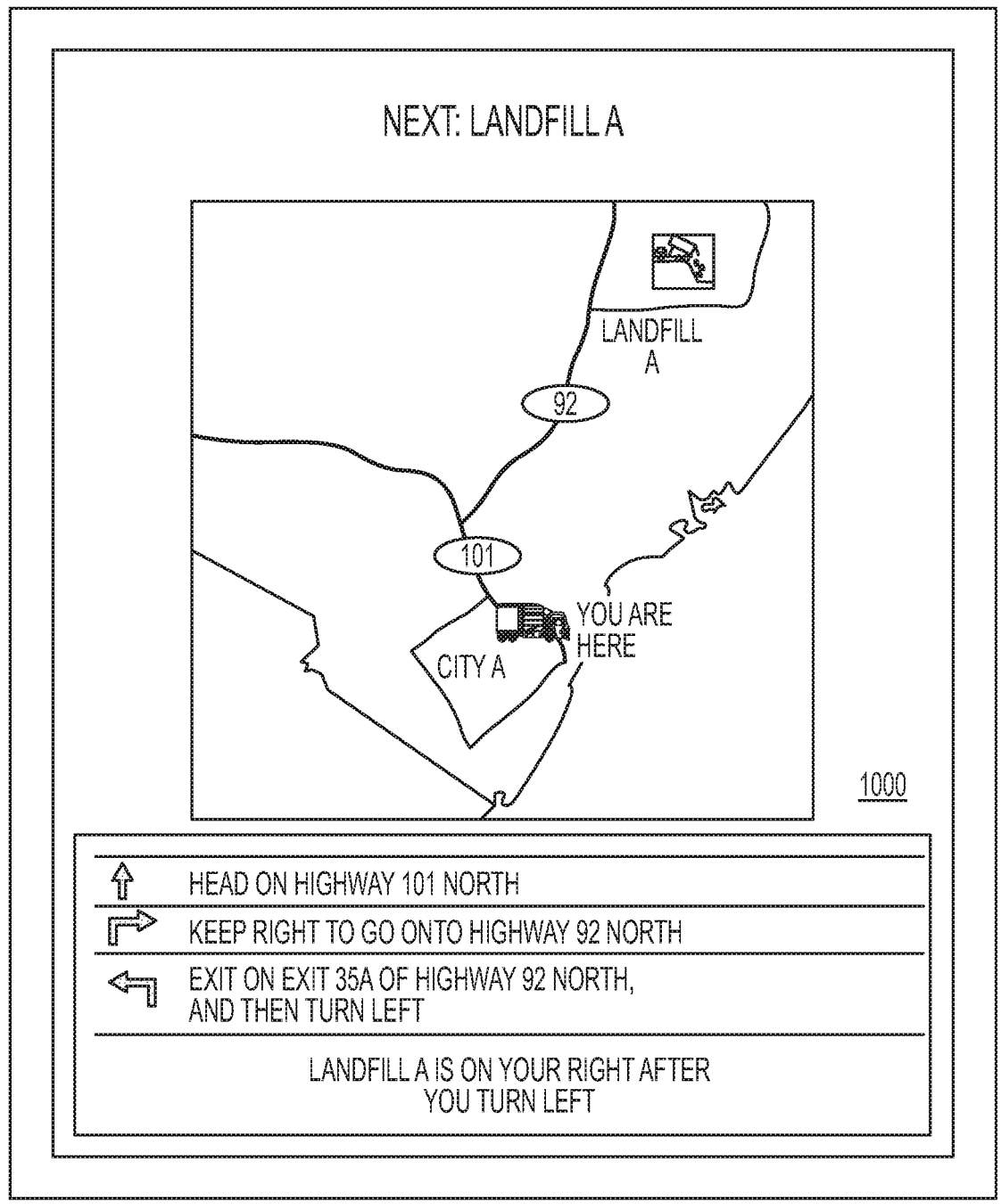
Figure 11:
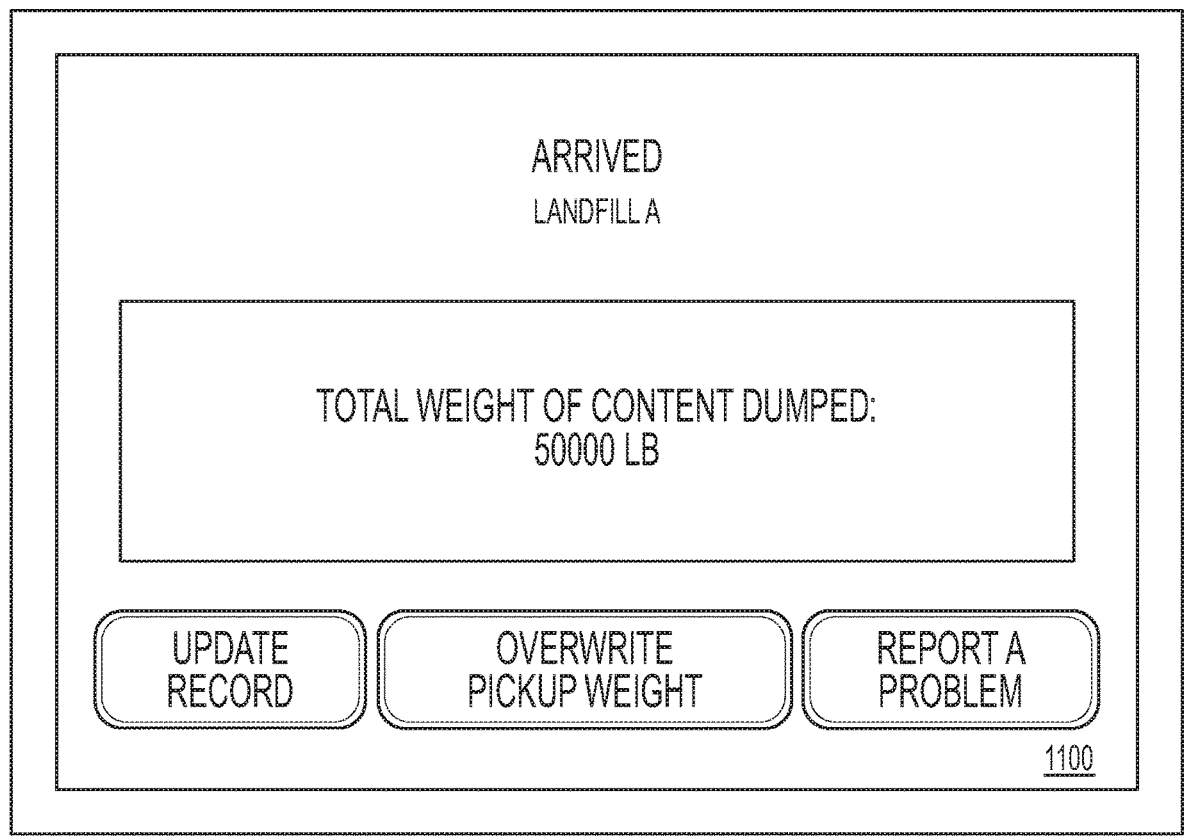

During completion of steps 315-350, following completion of step 365 (i.e., during travel toward the landfill as the next target location), GUI 1000 shown in FIG. 10 may be presented to the operator. GUI 1000 may illustrate a map and/or navigation information for assisting the operator to drive service vehicle 12 to a particular landfill (Landfill A). It is contemplated that GUI 1000 may be automatically displayed based on the current weight in service vehicle 12, based on completion of a previous waste service known to supersede travel to the landfill, or based on the detected approach of service vehicle 12 to the landfill; or based on manual input, as desired. Upon arriving at Landfill A and performing its assigned waste service (i.e., after dumping the contents of bed 16), GUI 1100 of FIG. 11 may be displayed. GUI 1100 may provide an indication of the weight of the waste contents disposed at Landfill A, and a way for the operator to update a status of the waste service. GUI 1100 may be similar to GUI 700, and allow the operator to also overwrite the weight of the deposited waste and/or to report a problem (e.g., via GUI 800).

Figure 12:
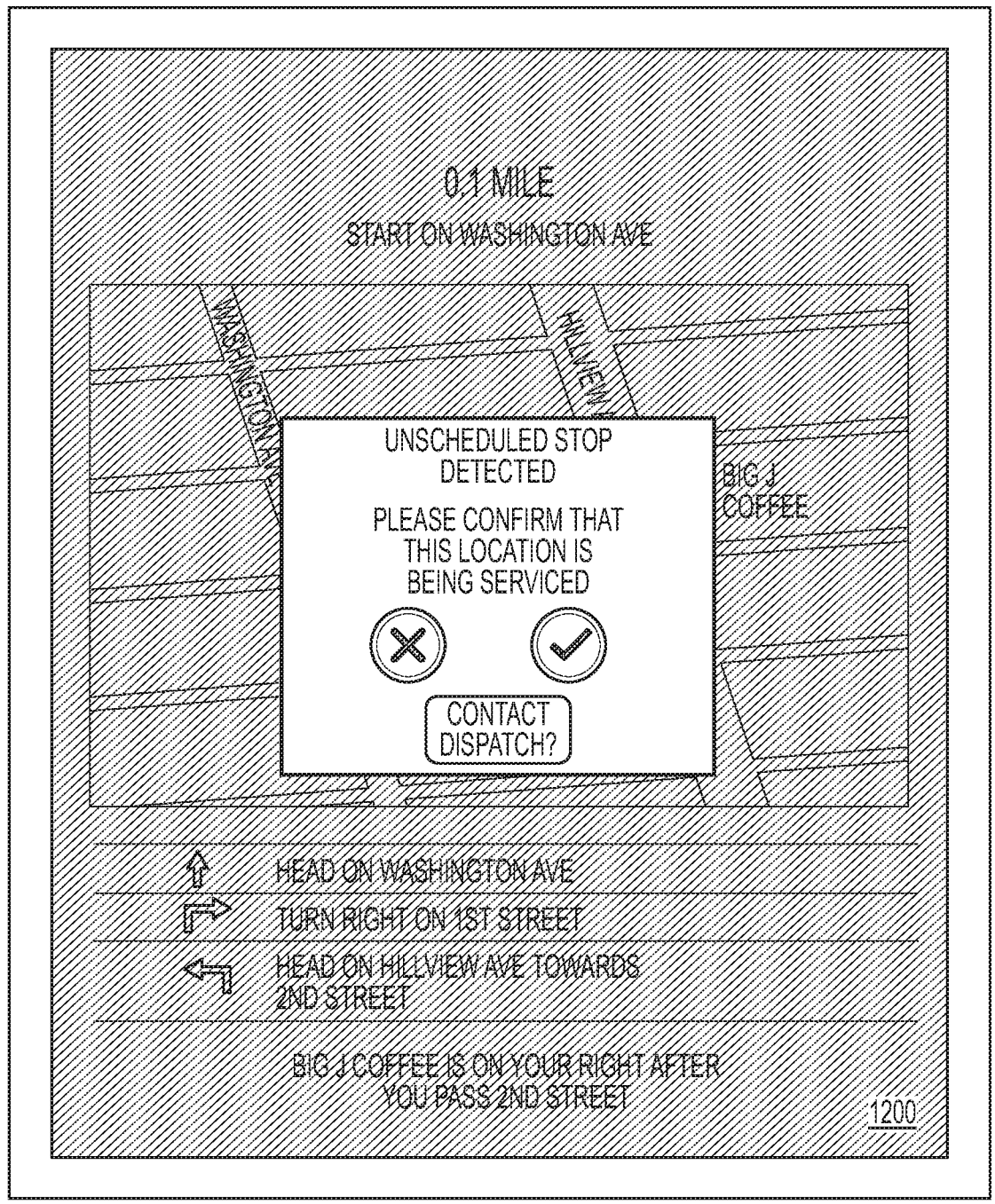

A final GUI 1200 is illustrated in FIG. 12 and associated with detection of an unscheduled stop, as described in reference to steps 380-390 described above. Specifically, after detection of an unscheduled stop and/or of performance of a waste service at the unscheduled stop, GUI 1200 may appear on input device 40. GUI 1200 may include in a background the map and/or directions to the next scheduled stop in the assigned route. In addition, GUI 1200 may include in a foreground a pop-up window notifying the operator that the unscheduled stop has been detected and asking the operator to confirm that service is being performed at the unscheduled stop. This may alert the operator in some instances of an error made by the operator in stopping and/or providing service at the current location.

The interfaces illustrated in FIGS. 4-12 are exemplary only and are provided to highlight certain aspects of the disclosed system. Other views and functionality are contemplated, as would be understood by one of skill in the art. It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

The disclosed system may provide tools that can be used to confirm performance of waste services and/or to account for waste services that cannot be performed. By detecting when a waste service has occurred and whether the service has been provided in accordance with the assigned schedule, the disclosed system may allow for efficient management of associated duties (e.g., billing, scheduling, payments, etc.). In addition, the disclosed system, based on confirmation that a particular waste service cannot be performed, may be able to selectively implement a remedial action that ensure customer satisfaction. All of these things may ultimately result in greater profitability for the service provider.

What is claimed is:

1. A system for managing waste services performed by a service vehicle, comprising:
   an acoustic sensor disposed onboard a first service vehicle that has lift arms that engage a receptacle and that are raised by one or more hydraulic actuators to one of: (i) tilt and dump the receptacle into the first service vehicle; and (ii) place the receptacle onto the first service vehicle for transport, the acoustic sensor positioned to detect a frequency signature produced by the one or more hydraulic actuators during lifting of the receptacle;
   one or more power sensors that generate at least one signal indicative of an amount of power used to drive the one or more hydraulic actuators; and
   a computing device communicatively coupled to the acoustic sensor and the one or more power sensors and configured to:
      monitor location of a service vehicle using a locating device onboard the service vehicle;
      monitor motion of the service vehicle using a motion sensor onboard the service vehicle;
      determine the service vehicle has arrived at a first service location based on determining a stop of the service vehicle using the monitored motion of the service vehicle being below a threshold speed and based on a proximity of the service vehicle from the first service location being below a threshold using the monitored location of the service vehicle;
      monitor the one or more power sensors;
      determine based on the at least one signals from the one or more power sensors that the hydraulic actuators are driven to move the lift arms;
      capture sound vibrations that comprise the frequency signature using the acoustic sensor based on the determination that the service vehicle has arrived at the first service location;
      identify the frequency signature in the captured sound vibrations during a first waste service;
      determine, based on a comparison of the frequency signature to a stored profile unique to a type, size, and configuration of the service vehicle, that the service vehicle has activated the one or more hydraulic actuators of lift arms of the service vehicle while engaged to a receptacle to perform the first waste service;
      in response to determining that the hydraulic actuators have been activated based on the one or more power sensors, and that the lifting arms lifted the receptacle, based on the frequency signature, generate an electronic record of the first waste service, including the comparison of the frequency signature to the stored profile and the monitored motion and location data corresponding to the first service vehicle.

2. The system of claim 1, wherein the computing device is configured to determine that the waste service has been performed at a target location based on the determination of the first waste service and based on the location of the service vehicle.

3. The system of claim 1, wherein the type of the service vehicle is front-loading.

4. The system of claim 1, wherein the computing device is further configured to:
   determine that the service vehicle has stopped; and
   to selectively activate the acoustic sensor only when the service vehicle has stopped.

5. The system of claim 1, wherein generating an electronic record of the first waste service includes a recommendation for an adjustment.

6. The system of claim 1, wherein the computing device is further configured to:
   receive a schedule of stops to be completed by the service vehicle at a plurality of known customer locations;
   make a determination that the service vehicle cannot complete a second waste service at one of the plurality of known customer locations based on the location of the service vehicle and the schedule of stops; and
   selectively adjust the schedule of stops based on the determination.

7. The system of claim 6, wherein:
   the service vehicle is a first service vehicle; and
   the computing device is further configured to selectively adjust the schedule of stops for the first service vehicle by removing the second waste service from the schedule of stops and selectively adding the second waste service to a schedule of stops corresponding to a second service vehicle.

8. The system of claim 6, wherein the computing device is further configured to adjust the schedule of stops by:
   rescheduling the second waste service; and
   adjusting a schedule of remaining stops within the schedule of stops to account for rescheduling of the second waste service.

9. The system of claim 6, wherein the computing device is configured to determine that the service vehicle cannot complete the second waste service at the one of the plurality of known customer locations based on the location of the service vehicle being outside of a distance to the one of the plurality of known customer locations.

10. The system of claim 9, wherein the computing device is further configured to continuously adjust the distance based on at least one of a movement direction of the service vehicle, a speed of the service vehicle, and a time at which a waste service is to be completed at the one of the plurality of known customer locations.

11. The system of claim 1, wherein the frequency signature of the one or more hydraulic actuators comprises an acoustic sound having a frequency in a range of 6000 Hz to 7000 Hz.

12. The system of claim 1, wherein the computing device is further configured to identify the frequency signature in the captured sound vibrations during a first waste service by:
   performing a fast Fourier transform (FFT) of the captured sound vibrations, and
   identifying the frequency signature based on a frequency domain output of the FFT.

13. A method for managing waste services performed by a service vehicle, the method comprising:
   monitoring location of a service vehicle using a locating device onboard the service vehicle;
   monitoring motion of the service vehicle using a motion sensor onboard the service vehicle;
   determining the service vehicle has arrived at a first service location based on determining a stop of the service vehicle using the monitored motion of the service vehicle being below a threshold speed and based on a proximity of the service vehicle from the first service location being below a threshold using the monitored location of the service vehicle;
   in response to determining that the service vehicle has arrived at the first service location:

determining based on one or more power sensors that the hydraulic actuators are being driven to move the lift arms;

capturing sound vibrations using an acoustic sensor disposed onboard the first service vehicle that has lift arms that engage a receptacle and that are raised by one or more hydraulic actuators to one of: (i) tilt and dump the receptacle into the first service vehicle; and (ii) place the receptacle onto the first service vehicle for transport, the one or more hydraulic actuators producing a frequency signature during lifting of the receptacle;

identifying the frequency signature in the captured sound vibrations during a first waste service;

determining, based on a comparison of the frequency signature to a stored profile unique to a type, size, and configuration of the service vehicle, that the service vehicle has activated the one or more hydraulic actuators of lift arms of the service vehicle, moving the receptacle, to perform the first waste service; and in response to determining that the hydraulic actuators have been activated based on the one or more power sensors, and that the lifting arms lifted the receptacle, based on the frequency signature, generating an electronic record of the first waste service, including the comparison of the frequency signature to the stored profile and the monitored motion and location data corresponding to the first service vehicle.

14. The method of claim 13, further comprising determining that the waste service has been performed at a target location based on the determination of the first waste service and based on the location of the service vehicle.

15. The method of claim 13, further including:
determining that the service vehicle has stopped; and
wherein the acoustic sensor is activated only when the service vehicle has stopped.

16. The method of claim 13, further including:
receiving a schedule of stops to be completed by the service vehicle at a plurality of known customer locations;
making a determination that the service vehicle cannot complete a second waste service at one of the plurality of known customer locations based on the schedule of stops; and
selectively adjusting the schedule of stops based on the determination.

17. The method of claim 16, wherein:
the service vehicle is a first service vehicle; and
selectively adjusting the schedule of stops includes selectively adjusting the schedule of stops by removing the second waste service from the schedule of stops and selectively adding the second waste service to a schedule of stops corresponding to a second service vehicle.

18. The method of claim 16, wherein making the determination that the service vehicle cannot complete the second waste service includes making the determination based on the location of the service vehicle being outside of a distance to the one of the plurality of known customer locations.

19. The method of claim 13, wherein the frequency signature of the one or more hydraulic actuators comprises an acoustic sound having a frequency in a range of 6000 Hz to 7000 Hz.

20. The method of claim 13, wherein identifying the frequency signature in the captured sound vibrations during the first waste service comprises:

performing a fast Fourier transform (FFT) of the captured sound vibrations, and
identifying the frequency signature based on a frequency domain output of the FFT.

21. A non-transitory computer readable medium containing computer-executable programming instructions for performing a method of waste management by a service vehicle, the method comprising:
monitoring location of a service vehicle using a locating device onboard the service vehicle;
monitoring motion of the service vehicle using a motion sensor onboard the service vehicle;
determining the service vehicle has arrived at a first service location based on determining a stop of the service vehicle using the monitored motion of the service vehicle being below a threshold speed and based on a proximity of the service vehicle from the first service location being below a threshold using the monitored location of the service vehicle;
in response to determining that the service vehicle has arrived at the first service location:
determining based on one or more power sensors that the hydraulic actuators are being driven to move the lift arms;
capturing sound vibrations using an acoustic sensor disposed onboard the first service vehicle that has lift arms that engage a receptacle and that are raised by one or more hydraulic actuators to one of: (i) tilt and dump the receptacle into the first service vehicle; and (ii) place the receptacle onto the first service vehicle for transport, the one or more hydraulic actuators producing a frequency signature during lifting of the receptacle;
identifying the frequency signature in the captured sound vibrations during a first waste service;
determining, based on a comparison of the frequency signature to a stored profile unique to a type, size, and configuration of the service vehicle, that the service vehicle has activated the one or more hydraulic actuators of lift arms of the service vehicle, moving the receptacle, to perform the first waste service; and
in response to determining that the hydraulic actuators have been activated based on the one or more power sensors, and that the lifting arms lifted the receptacle, based on the frequency signature, generating an electronic record of the first waste service, including the comparison of the frequency signature to the stored profile and the monitored motion and location data corresponding to the first service vehicle.

22. The non-transitory computer readable medium of claim 21, the method further comprising:
receiving a schedule of stops to be completed by the service vehicle at a plurality of known customer locations;
making a determination that the service vehicle cannot complete a second waste service at one of the plurality of known customer locations based on the schedule of stops; and
selectively adjusting the schedule of stops based on the determination.

23. The non-transitory computer readable medium of claim 21, the method further comprising:
receiving a schedule of stops to be completed by the service vehicle at a plurality of known customer locations;

determining that the service vehicle cannot complete a second waste service at one of the plurality of known customer locations based on the location of the service vehicle being outside of a distance to the one of the plurality of known customer locations; and
continuously adjusting the distance based on at least one of a movement direction of the service vehicle, a speed of the service vehicle, and a time at which the second waste service is to be completed at the one of the plurality of known customer locations.

24. The non-transitory computer readable medium of claim 21, wherein the frequency signature of the one or more hydraulic actuators comprises an acoustic sound having a frequency in a range of 6000 Hz to 7000 Hz.

25. The non-transitory computer readable medium of claim 21, wherein identifying the frequency signature in the captured sound vibrations during the first waste service comprises:
   performing a fast Fourier transform (FFT) of the captured sound vibrations, and
   identifying the frequency signature based on a frequency domain output of the FFT.

\* \* \* \* \*